United States Patent
Liukkonen et al.

(10) Patent No.: US 11,210,864 B2
(45) Date of Patent: Dec. 28, 2021

(54) SOLUTION FOR GENERATING VIRTUAL REALITY REPRESENTATION

(71) Applicant: Immersal Oy, Helsinki (FI)

(72) Inventors: Panu Liukkonen, Kellokoski (FI); Tatu Blomberg, Helsinki (FI); Teemu Berglund, Helsinki (FI); Tuomas Paavola, Helsinki (FI); Mikko Karvonen, Helsinki (FI)

(73) Assignee: Immersal Oy, Helsinki (FI)

( * ) Notice: Subject to any disclaimer, the term of this patent is extended or adjusted under 35 U.S.C. 154(b) by 0 days.

(21) Appl. No.: 17/059,883

(22) PCT Filed: May 29, 2019

(86) PCT No.: PCT/FI2019/050415
§ 371 (c)(1),
(2) Date: Nov. 30, 2020

(87) PCT Pub. No.: WO2019/229301
PCT Pub. Date: Dec. 5, 2019

(65) Prior Publication Data
US 2021/0209856 A1    Jul. 8, 2021

(30) Foreign Application Priority Data
Jun. 1, 2018   (FI) ..................... 20185504

(51) Int. Cl.
*G06T 19/00* (2011.01)
*G06T 7/536* (2017.01)
*G06F 3/01* (2006.01)

(52) U.S. Cl.
CPC ............ *G06T 19/006* (2013.01); *G06F 3/011* (2013.01); *G06T 7/536* (2017.01)

(58) Field of Classification Search
CPC ........ G06T 19/006; G06T 7/536; G06F 3/011
See application file for complete search history.

(56) References Cited

U.S. PATENT DOCUMENTS

2007/0027591 A1    2/2007  Goldenberg et al.
2009/0097710 A1    4/2009  Spoka et al.
(Continued)

OTHER PUBLICATIONS

Search Report for Finnish Patent Application No. 20185504 dated Dec. 20, 2018.
(Continued)

*Primary Examiner* — Terrell M Robinson
(74) *Attorney, Agent, or Firm* — Meunier Carlin & Curfman LLC (57) ABSTRACT

The present invention relates to a method for generating virtual reality representation for a plurality of terminal devices. The method comprises: generating location-based data from two sources, a first location-based data representing a terminal device specific local pose coordinates and a second location-based data representing photogrammetric coordinates; constructing a terminal device specific coordinate conversion between coordinates; receiving virtual content; and generating terminal device specific virtual reality representation by applying the constructed terminal device specific coordinate conversion to the received virtual content. The invention also relates to a system and to a computer program product.

13 Claims, 4 Drawing Sheets

(56) References Cited

U.S. PATENT DOCUMENTS

| | | | |
|---|---|---|---|
| 2009/0147003 A1* | 6/2009 | Do | G06T 15/205 |
| | | | 345/427 |
| 2010/0287485 A1 | 11/2010 | Bertolami et al. | |
| 2014/0015924 A1* | 1/2014 | Pryor | H04N 13/122 |
| | | | 348/43 |
| 2015/0213649 A1* | 7/2015 | Morishita | G06T 15/005 |
| | | | 345/419 |
| 2017/0032574 A1* | 2/2017 | Sugaya | H04L 67/12 |
| 2017/0132843 A1 | 5/2017 | Fan et al. | |
| 2018/0091791 A1 | 3/2018 | Jiang et al. | |
| 2020/0286289 A1* | 9/2020 | Mitchell | G02B 27/0172 |

OTHER PUBLICATIONS

Ventura et al., Global Localization from Monocular SLAM on a Mobile Phone. In: IEEE Transactions on Visualization and Computer Graphics. IEEE Computer Society, Apr. 1, 2014.

International Search Report and Written Opion for International Application No. PCT/FI2019/050415 dated Jul. 25, 2019.

Anonymous, "Photogrammetry—Wikipedia," May 15, 2018, Retrieved from the Internet: URL: https://en.wikipedia.org/w/index.php?title=Photogrammerty&oldid=841300282 [retrieved on Jul. 18, 2019].

\* cited by examiner

SOLUTION FOR GENERATING VIRTUAL REALITY REPRESENTATION

CROSS-REFERENCE TO RELATED APPLICATIONS

This application is a national stage application filed under 35 U.S.C. § 371 of PCT/FI2019/050415 filed May 29, 2019, which claims priority to and benefit of Finnish patent application number 20185504 filed Jun. 1, 2018, the content of which is incorporated herein by reference in its entirety.

TECHNICAL FIELD

The present invention concerns the technical field of communications. More particularly, the invention concerns a solution for providing virtual or augmented reality content to one or more users.

BACKGROUND

Virtual reality (VR) and augmented reality (AR) environments are displayed to users on various devices by rendering the content based on the user's point of view. For example, an AR system can include a display showing a real time image of the real environment of the device, and virtual content, such as entertainment, navigational guidance, video game contents, or advertisements, is rendered on the display on top of the real environment. Rendering the virtual content so that it functionally and aesthetically matches the user's changing point of view requires that a location and an orientation (collectively "pose") of the displaying device is tracked continuously, and the rendering is correspondingly in real time.

Numerous methods for tracking the pose of a device are known, such as inertial sensor-based methods, photogrammetric methods, simultaneous localization and mapping (SLAM) etc.

Inertial sensor based, or "odometric", methods can be used to determine the pose of a device. Some devices, such as smartphones, even include several different sensors (e.g. accelerometers, gyroscopes, magnetometers, satellite positioning or cameras) and provide an integrated pose information estimate for use in AR, VR and other applications. The pose determined with these methods is local to the device, in some internal coordinate system of the device, not shared by other devices, systems or content.

When several users are experiencing the same virtual content, for example viewing the same virtual object in an AR setting, the virtual content needs to be delivered to each device along with the information of the pose of the virtual content. The devices need to share a coordinate system with the virtual content in order to be able to render it correctly from their point of view. This can be achieved by tracking the position of each device in some global coordinate system, as is done with e.g. photogrammetric or SLAM methods, where images from a device camera are used to reconstruct the surrounding environment and to determine the location of the device in that reconstruction's coordinate system. However, such methods are often computationally expensive, slow and relatively inaccurate, and as such not suitable for real time rendering, especially in mobile devices.

Hence, there is a need to develop solutions mitigating the above described drawbacks, which also allow fast, accurate ways for displaying shared virtual content in many devices.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a system and a computer program product for generating virtual reality representation. Another objective of the invention is that the method, the system and the computer program product for generating virtual reality representation generate virtual reality representation that is device specific.

The objectives of the invention are reached by a method, a system and a computer program product as defined by the respective independent claims.

According to a first aspect, a method for generating virtual reality representation for a plurality of terminal devices is provided, the method comprising: generating, for the plurality of terminal devices, location-based data from two sources, a first location-based data representing a terminal device specific local pose coordinates and a second location-based data representing photogrammetric coordinates; constructing, for the plurality of terminal devices, a terminal device specific coordinate conversion between the local pose coordinates and the photogrammetric coordinates; receiving virtual content; and generating terminal device specific virtual reality representation by applying the constructed terminal device specific coordinate conversion to the received virtual content.

The generation of the second location-based data representing the photogrammetric coordinates may be performed by the plurality of terminal devices or a server in response to a receipt of image data from the plurality of the terminal devices.

Further, the construction of the coordinate conversion may be performed by the plurality of the terminal devices or the server in response to a receipt of the location-based data from the two sources. In response to the construction of the coordinate conversion by the server the constructed coordinate conversion may be transmitted to the at least one terminal device.

The terminal device specific virtual reality representation may be generated by a terminal device by applying a constructed terminal device specific coordinate conversion of another terminal device. An application of the constructed coordinate conversion of the other terminal device may be performed in a context of image data stored in a memory of the other terminal device.

According to a second aspect, a system for generating virtual reality representation is provided, the system comprising: a plurality of terminal devices, a server; wherein the system is configured to: generate, for the plurality of terminal devices, location-based data from two sources, a first location-based data representing a terminal device specific local pose coordinates and a second location-based data representing photogrammetric coordinates; construct, for the plurality of terminal devices, a terminal device specific coordinate conversion between the local pose coordinates and the photogrammetric coordinates; wherein the plurality of terminal devices are configured to: receive virtual content; and generate terminal device specific virtual reality representation by applying the constructed terminal device specific coordinate conversion to the received virtual content.

The generation of the second location-based data representing the photogrammetric coordinates may be configured to be performed by the plurality of terminal devices or a server in response to a receipt of image data from the plurality of terminal devices.

Further, the construction of the coordinate conversion may be configured to be performed by the plurality of the terminal devices or the server in response to a receipt of the location-based data from the two sources. The server may be configured to, in response to the construction of the coordinate conversion, transmit the constructed coordinate conversion to the at least one terminal device.

The terminal device specific virtual reality representation may be configured to be generated by a terminal device by applying a constructed terminal device specific coordinate conversion of another terminal device.

An application of the constructed coordinate conversion of the other terminal device may be configured to be performed in a context of image data stored in a memory of the other terminal device.

According to a third aspect, a computer program product for generating virtual reality representation is provided, which, when executed by at least one processor, cause a computing device to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
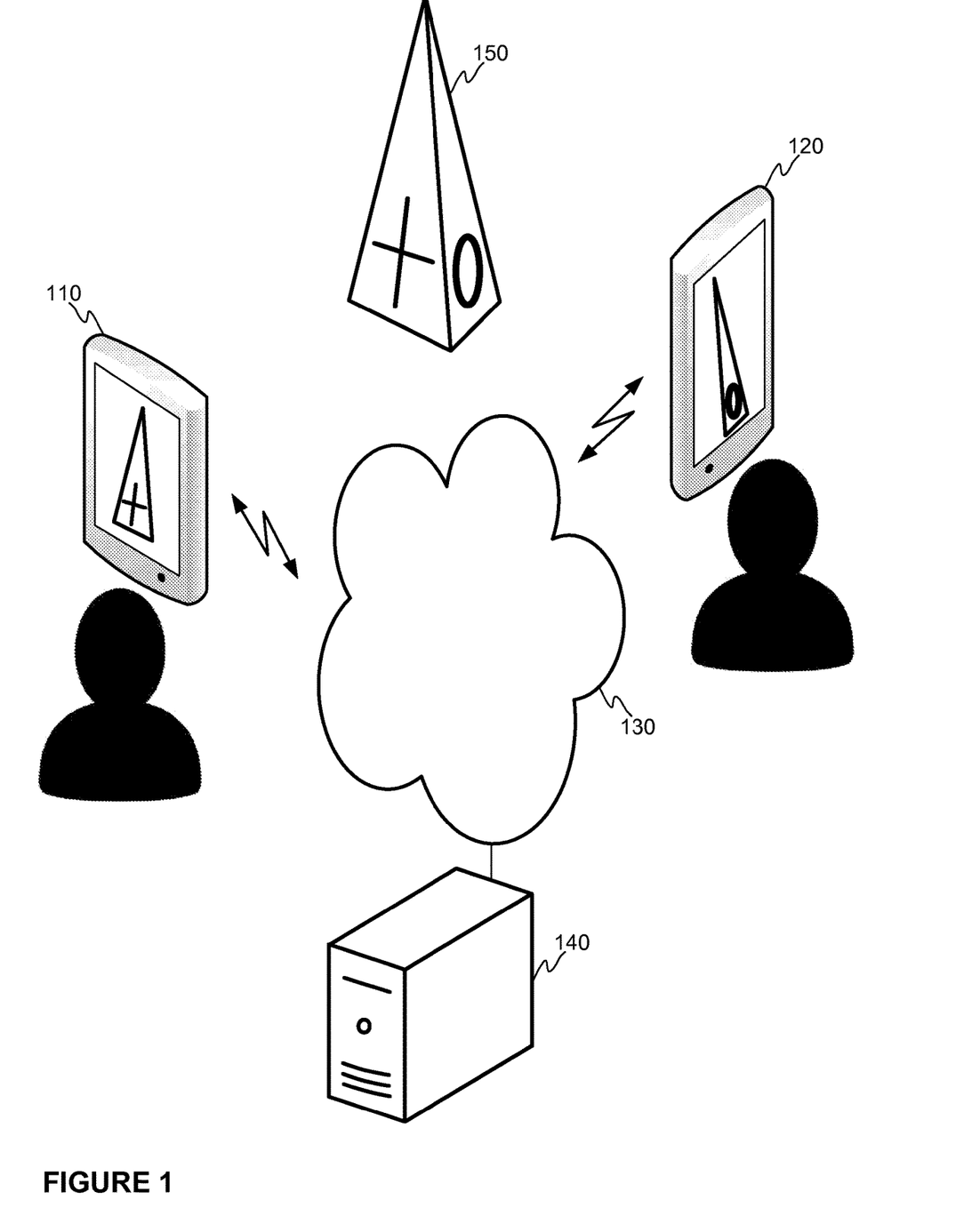
FIG. 1 illustrates schematically a system according to an embodiment of the invention.

FIG. 1 schematically illustrates an example of a communication system into which the present invention may be implemented to. The communication system may comprise a plurality of terminal devices 110, 120 and at least one server 140 wherein the terminal devices 110, 120 and the at least one server 140 may be communicatively coupled to each other over a communication network 130. The communication network 130 may implement a wireless communication, such as any mobile communication technology, or a wired communication technology, such as communication implementing Internet Protocol (IP), for enabling the communication between the entities. For the purpose of describing at least some aspects of the present invention it is hereby assumed, by not limiting the invention anyhow, that the terminal devices 110, 120 are configured to communicate in a wireless manner to the communication network 130 and over that to any other entity. The server functionality may be implemented with one server device or a plurality of server devices e.g. configured to perform so-called cloud computing.

The terminal device 110, 120 may be configured so that it is suitable for generating virtual or augmented reality data in a manner as will be described.

The terminal device 110, 120 may be equipped so that it may generate data representing a pose of the terminal device 110, 120. The pose data generated by the terminal device 110, 120 in the context of the present invention may at least comprise/cover three-dimensional position in the space and orientation of the terminal device 110, 120 therein. For generating pose data the terminal device 110, 120 may be equipped with necessary sensors, such as inertial sensors like accelerometers and gyroscopes, as well as other sensors, like magnetometers, and sensor systems, such as satellite positioning system. Further, the terminal device 110, 120 may comprise an image capturing device, such as a digital camera, as a further sensor device for capturing an image of an object 150. The terminal device 110, 120 may also comprise a processing unit and a memory unit as well as other necessary hardware and software elements for causing the terminal device 110, 120 to operate in a manner as will be described.

In order to describe at least some further aspects of the present invention a term virtual reality is used for representing all different data types, which may be generated in the context of the present invention. It covers at least a virtual reality data, an augmented reality data, a hybrid reality data and a mixed reality data.

Figure 2:
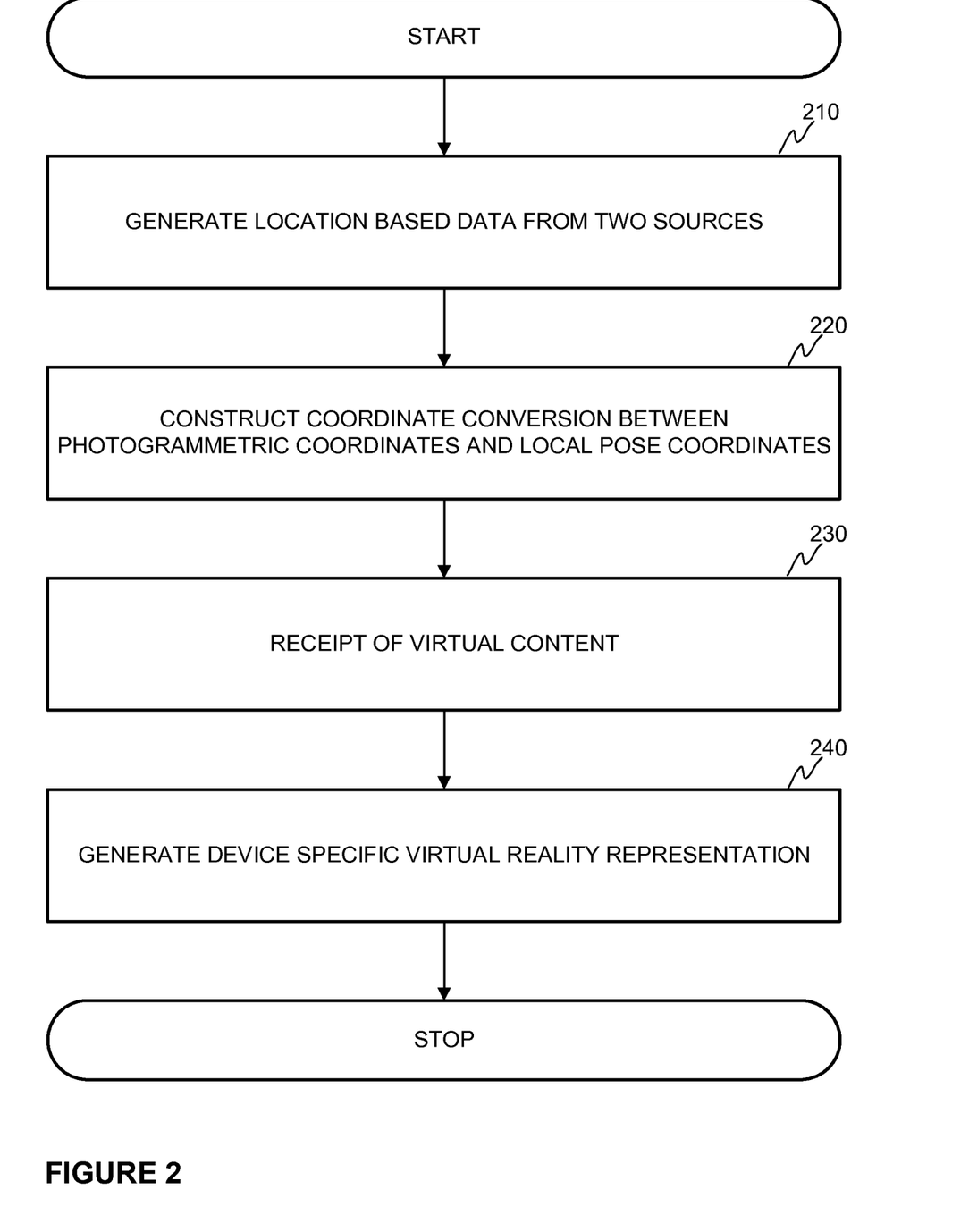
FIG. 2 illustrates schematically a method according to an embodiment of the invention.

Next, at least some aspects of the present invention are now described by referring to FIG. 2 in which it is schematically disclosed at least some method steps from a terminal device 110, 120 point of view. In other words, the terminal device 110, 120 may be configured to perform the method as schematically illustrated in FIG. 2. In the following, at least some aspects of each step are discussed. Generally speaking it may be assumed that the terminal device 110, 120 may execute an application causing an execution of the method in a logical order to achieve the result as will be described.

Regarding step 210 of FIG. 2:

As a starting point the terminal device 110, 120 may be instructed, by e.g. a user, to generate virtual reality data for displaying it on a display of the terminal device 110, 120. The instruction to generate the virtual reality data in one terminal device 110, 120 may cause an execution of the method in a plurality of terminal devices 110, 120 at least in part concurrently so that the users of the corresponding terminal devices 110, 120 may receive a shared user experience. Alternatively, a plurality of terminal devices 110, 120 may be instructed, e.g. concurrently, to generate the virtual reality data with the method.

In response to a receipt of the instruction, i.e. a trigger signal, to generate virtual reality data the terminal device 110, 120 may be configured to initiate a generation of location-based data from two sources. A first location-based data may refer to the pose data generated from data obtained from one or more sensors, such as inertial sensors, residing in the terminal device 110, 120 in question. Hence, the first location-based data is based on the pose in local coordinate system, such as for example the coordinate system of odometric sensors, of the terminal device 110, 120 in question. A second location-based data may refer to photogrammetric data obtained from an image captured with an image capturing device of the terminal device 110, 120 with known photogrammetric methods. In other words, the terminal device 110, 120 may be configured to capture an image from the object 150 and apply a predetermined photogrammetric method to the image data to generate photogrammetric data of the image data. The photogrammetric data as the second location-based data is based on coordinate system derived from the captured image. In other words, the first location-based data and the second location-based data are expressed in coordinates of the corresponding coordinate system, as described above.

As mentioned, a plurality of terminal devices 110, 120 may be configured to perform the method steps of FIG. 2, wherein the plurality of terminal devices 110, 120 are arranged to capture an image from the same object 150 for generating virtual reality data in order to provide a shared user experience in a form of a shared virtual reality. The capture of the image from the same object 150 by the plurality of terminal devices 110, 120 means that the photogrammetric coordinates are in a shared photogrammetric coordinate system common to the plurality of terminal devices 110, 120.

Regarding step 220 of FIG. 2:

Next, a coordinate conversion between a photogrammetric coordinates and local pose coordinates is constructed. The construction of the coordinate conversion refers at least to an operation in which a terminal device specific conversion mechanism, such as an algorithm, is established between the two coordinate systems as described above by means of which it is possible to transform coordinates expressed in one coordinate system to coordinates in the other coordinate system. For the purpose of the present invention the construction of the terminal device 110, 120 specific coordinate conversion may be established between the local pose coordinates and the photogrammetric coordinates. In other words, a mapping rule between a terminal device's 110, 120 position expressed in local pose coordinates and terminal device's 110, 120 position expressed in coordinates in a photogrammetric coordinate system derived from the captured image may be generated. Naturally, the conversion in another direction may also be achieved by performing an inverse transform with the generated mapping rule. Hence, the terminal device 110, 120 specific mapping rule and the terminal device 110, 120 specific inverted mapping rule may be used with any position of the terminal device 110, 120 to perform mapping between the different coordinate systems.

As a non-limiting example of the conversion between the coordinate systems we may define a local pose of the terminal device 110, 120 with a 4×4 matrix as follows:

$$\text{pose} = \begin{bmatrix} R & t \\ 0 & 1 \end{bmatrix}$$

where is R is a 3×3 rotation matrix and t a translation vector.

Now, it is denoted that A is a pose in device space (ARKit space), and B is a corresponding pose in photogrammetric space.

Hence, the mapping from photogrammetric space to device space is $$f(X) = A * inv(B) * X$$

Thus, the pose in the photogrammetric space may map to $$f(B) = A * inv(B) * B$$

Regarding step 230 of FIG. 2:

During the process of generation of the virtual reality data for a terminal device 110, 120 virtual content is received in at least two terminal devices of the plurality of the terminal device. The virtual content refers to data containing definitions of the virtual content to be displayed. The virtual content when output may refer to virtual content, such as entertainment, navigational guidance, video game content, or advertisements expressed e.g. as digital pixel images or 3-dimensional models on the display of the device, as non-limiting examples. The virtual content may be received from the server 140, which is configured to transmit the virtual content either automatically or in response to a receipt of a request for the virtual content from one or more terminal devices 110, 120. According to an embodiment the terminal device 110, 120 may be configured so that it generates a request to the server 140 for requesting virtual content. The request may carry one or more parameters which is taken into account by the server 140 when selecting virtual content to be delivered to the terminal device 110, 120 requesting the virtual content. The one or more parameters may e.g. represent information indicating either directly or indirectly location-based aspects or object-based aspects. According to an embodiment a geographical location of the terminal device 110, 120 e.g. as a GPS coordinates may be provided. Alternatively or in addition, the terminal device 110, 120 may be configured to analyze the image captured with the image capturing device of the terminal device 110, 120 and detect there a type of the object, such as a car, and provide that information to the server 140. In response to the receipt of the request with the one or more parameters the server 140 may be configured to read the parameters from the request, apply predetermined rules with the parameters, and in that manner obtain the virtual content to be delivered to the at least one terminal device 110, 120 from data storage. The data storage may e.g. be implemented as a database, for example.

Regarding step 240 of FIG. 2:

In step 240 of the method as schematically illustrated in FIG. 2 it is generated terminal device 110, 120 specific virtual reality representation for displaying it on a display of the terminal device 110, 120 in question. The generation of the terminal device specific virtual reality refers to an operation in which the received virtual content is prepared for displaying in the terminal device 110, 120. In other words, the generation of the terminal device specific virtual reality comprises a sub-step in which the virtual content is posed for rendering in a device-specific manner. The posing of the virtual content may be performed by transforming a virtual content pose from photogrammetric coordinates to device-specific local pose coordinates with the coordinate conversion mechanism constructed in step 220. As a result, when the pose of the virtual content is dependent on the pose of the terminal device 110, 120 the virtual content may be rendered accurately as the pose of the terminal device 110, 120 is tracked in the local pose coordinate system.

In order to provide more details on the above, the received virtual content may be created so that it is defined in the common photogrammetric coordinate system for the plurality of terminal devices 110, 120, or its coordinates can be transformed using a predetermined coordinate transform. If the virtual content placement is done in a first terminal device 110, its coordinates may be in the first terminal device's 110 local pose coordinate system and is transformed to the common photogrammetric coordinate system using the first terminal device's 110 coordinate transform.

As a result of the step 240 the generated virtual content may be represented in a display of the terminal device 110, 120 in question.

At least some of the method steps, or parts of them, as described above may be performed either in the terminal device 110, 120 or on the server 140 or the functionality may be shared between these two entities. The server 140, in turn, may be implemented with one or more server devices so that in a case of a plurality of server devices a computing is implemented in a distributed manner. For example, the step 210 may be fully or in part be performed in the terminal device 110, 120. Alternatively, the terminal device 110, 120 may be configured to perform necessary measurements as well as to capture an image of the object 150 and transmit the obtained data to the server 140 for the generation of the location-based data as described. Further, depending on the implementation of the step 210 the step 220 may also be performed by the terminal device 110, 120 or by the server 140. In case the step 220 is performed by the server 140 the server 140 may be configured to transmit data, or instructions, to the terminal device 110, 120 with respect to conversion. For example, the server 140 may be configured to generate a rule, such as an equation, for the conversion which may be transmitted to the terminal device 110, 120 wherein the actual conversion is performed e.g. when the received virtual content is modified in the step 240. As regards to the step 230 it is preferable that the server 140 transmits the virtual content selected by predetermined criteria to the terminal device 110, 120 in question, but according to another embodiment the virtual data may be stored in a memory accessible to a processing unit of the terminal device 110,120 from where it is retrieved. In this kind of embodiment the server 140 may be configured to instruct the plurality of the terminal device 110, 120 to retrieve the same virtual content from the memory in order to achieve the shared user experience if this is desirable. The step 240 may be typically implemented in the terminal device 110, 120 in order to enable an adjustment of the virtual reality representation in accordance with a motion of the terminal device 110, 120. However, depending on the implementation of the present invention in some other application area it may be arranged that the server 140 is configured to perform the whole generation of the device specific virtual reality representation for the terminal device 110, 120, which in response to a receipt of the virtual reality representation is configured to display the representation on the display to the user.

In the description of at least some aspects of the present invention above it is mainly referred to a situation in which a plurality of terminal devices 110, 120 reside within an environment close to the object 150 in question so that both device may e.g. capture an image of the object 150. However, the present invention may also be applied in a further terminal device 110, 120 residing outside the environment. Namely, the further terminal device 110, 120 residing outside the environment may display saved or live images received from the first or second terminal device 110, 120 residing within the environment in question, and the virtual content be placed based on the image, e.g. by selecting the content placement in the image coordinates or the common photogrammetric coordinates. This enables the placement to be accurate from the viewing terminal device's point of view and does not require a global mapping of the environment to exist.

Figure 3A:
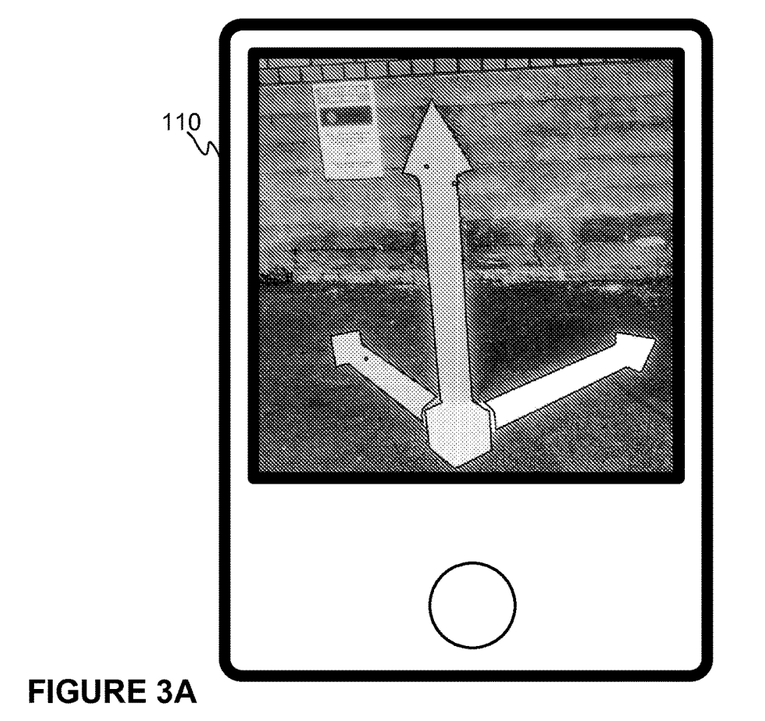
FIG. 3A and FIG. 3B illustrate schematically an example of a result of a method according to an embodiment of the invention.
Figure 3B:
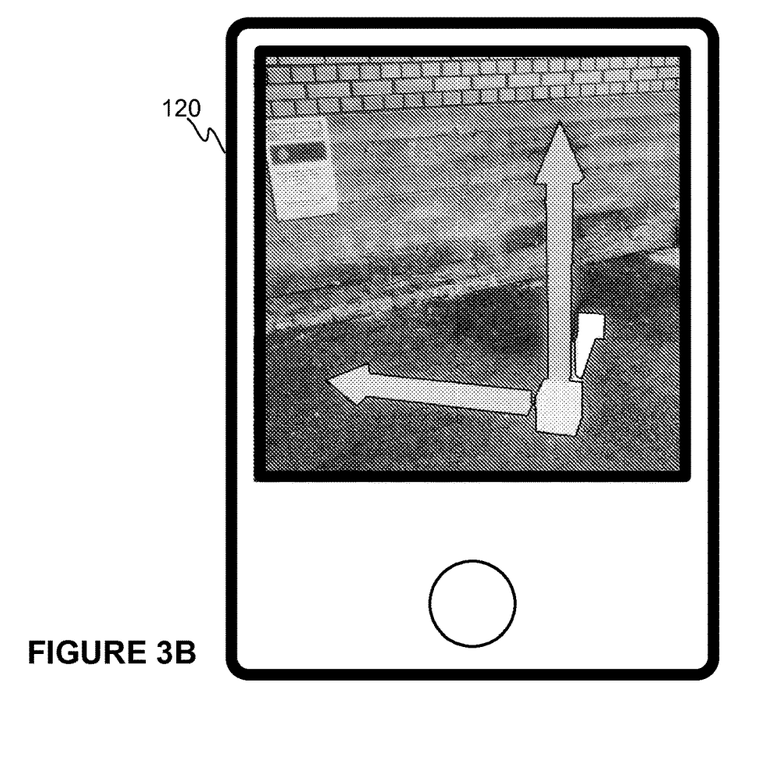

FIG. 3A and FIG. 3B illustrate schematically an example of a result from a generation of terminal device 110, 120 specific virtual reality representation. FIG. 3A illustrates an example of a representation comprising the virtual content in an environment displayed on a display of the terminal device 110. Correspondingly, FIG. 3B illustrates an example of a representation comprising the virtual content in an environment displayed on a display of the terminal device 120. As may be seen from FIGS. 3A and 3B both terminal devices 110, 120 display the same virtual content but it is adjusted for outputting in device specific manner taking into account the pose of each terminal device 110, 120 within the space with respect to a common coordinate system derived with the photogrammetric method. As a result, the virtual content may be adjusted in the device specific manner.

Figure 4:
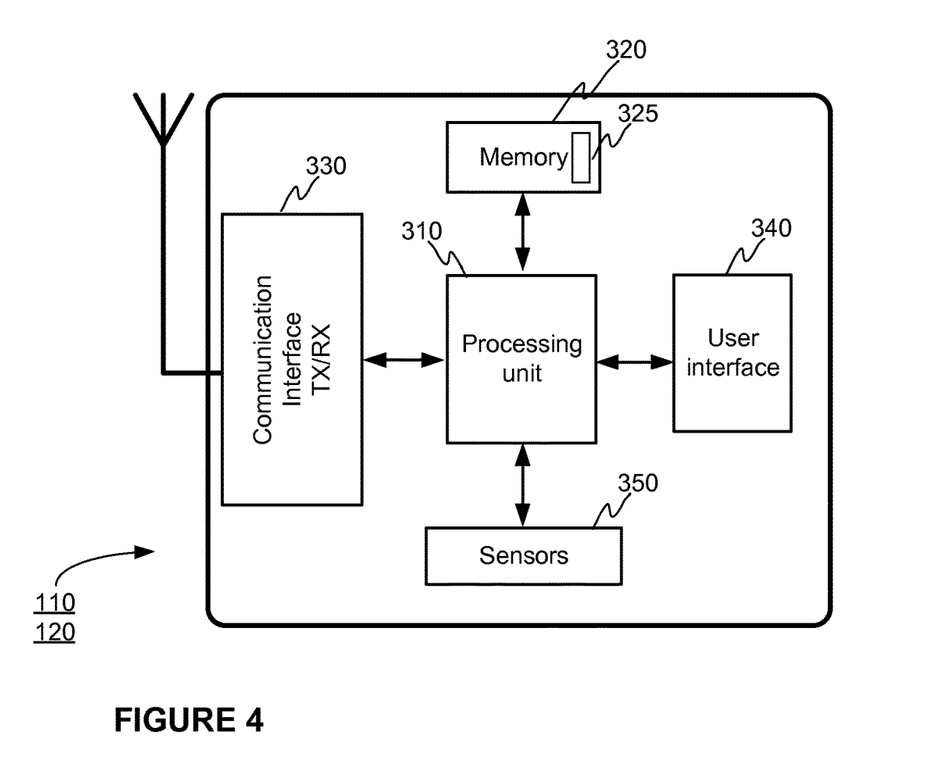
FIG. 4 illustrates schematically a terminal device according to an embodiment of the invention.

As already mentioned the communication system according to an embodiment of the invention may comprise a plurality of terminal devices 110, 120 and a server 140 communicatively coupled to each other. An example of the terminal device 110, 120 suitable for the operating in the system according to an embodiment of the invention is schematically illustrated in FIG. 4. The terminal device 110, 120 may comprise a processing unit 310 comprising one or more processor for executing at least portions of computer program code 325 stored in a memory unit 320. The memory unit 320 may comprise memories suitable for storing digital data and suitable for inputting and outputting the digital data therein and therefrom. The terminal device 110, 120 may also comprise one or more communication interfaces 330 for implementing a communication technology by means of which the terminal device 110, 120 may communicate with any external entity, such as with the server 140 over a communication network. In other words, the communication interface 330 may be configured to implement wired or wireless communication technology or both. Thus, the communication interface 330 comprises necessary hardware and software components, such as a modem, for implementing the communication. Still further, the terminal device 110, 120 may comprise a user interface 340 comprising one or more input and output devices by means of which it is possible to input information in the terminal device 110, 120 and to output information from the terminal device 110, 120. Some non-limiting examples of devices belonging to the user interface may e.g. be button, keyboard, display, touch screen, microphone, loudspeaker and so on. The terminal device 110, 120 may also comprise one or more sensors by means of which measurement data may be generated. For example, for generating pose data for the purpose of implementing the method according to an embodiment of the invention the terminal device 110, 120 may be equipped with necessary sensors, such as inertial sensors like accelerometers and gyroscopes, as well as other sensors, like magnetometers, and sensor systems, such as satellite positioning system. Further, the terminal device 110, 120 may comprise an image capturing device, such as a digital camera, as a further sensor device for capturing an image of the object 150 as mentioned before. The mentioned entities belonging to the terminal device 110, 120 may be coupled to each other either directly or indirectly with a data bus by means of which data may be conveyed between the elements. FIG. 4 does not illustrate all necessary components and elements for enabling an operation of the terminal device 110, 120, but only the most relevant elements from the present invention point of view are depicted.

Figure 5:
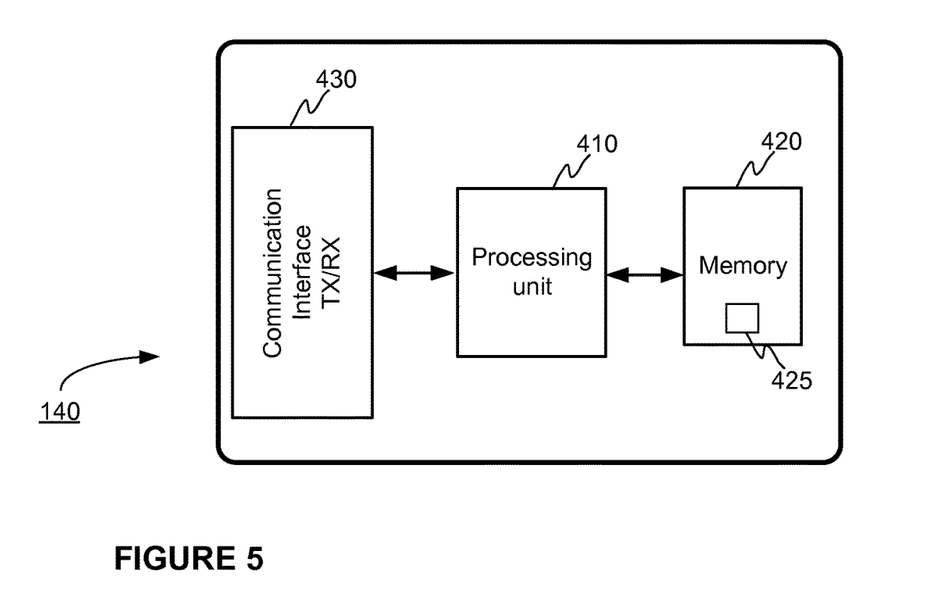
FIG. 5 illustrates schematically a server according to an embodiment of the invention.

Moreover, FIG. 5 illustrates a server 140 belonging to the system according to an embodiment of the invention. As already mentioned the server 140 may be communicatively coupled to other entities with either wired or wireless communication technology implemented by a communication interface 430 of the server 140. The communication interface 430 may comprise necessary hardware and software components, such as a modem, for implementing the communication. Furthermore. the server 140 may comprise a processing unit 410 comprising one or more processors for performing at least some of the method steps as described. The processing unit 410 may be configured to generate the operational instructions causing the server 140 to operate accordingly by executing portions of computer program code 425 stored in a memory 420 of the server 140.

The benefits of the present invention are that the computationally expensive photogrammetric localization does not need to be done often, or in real time while tracking the terminal device 110, 120. Hence, it allows using the fast, accurate local pose tracking in the terminal device 110, 120, while sharing the experience of the virtual content between several terminal devices 110, 120. Because the photogrammetric localization does not need to be done in real time, it may be done, in at least some embodiments of the invention, outside the terminal device 110, 120 on a server 140 without ill effects from e.g. network transfer times or other time delays.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for generating virtual reality representation for a plurality of terminal devices, the method comprising:
generating, for the plurality of terminal devices, location-based data from two sources, a first location-based data representing a terminal device specific local pose coordinates, the first location-based data is obtained from at least one odometric sensor, and a second location-based data representing photogrammetric coordinates, the second location-based data is obtained from an image captured with each terminal device of the plurality of terminal devices and generated at predefined intervals in non-real-time,
constructing, for the plurality of terminal devices, a terminal device specific coordinate conversion mechanism between the local pose coordinates and the photogrammetric coordinates, the terminal device specific coordinate conversion mechanism is constructed based on a common photogrammetric coordinate system established based on a common object in images captured with each terminal device,
receiving virtual content in the photogrammetric coordinates based on the location of the terminal device in the photogrammetric coordinates, and
generating terminal device specific virtual reality representation by applying the constructed terminal device specific coordinate conversion to the received virtual content.

2. The method of claim 1, wherein the generation of the second location-based data representing the photogrammetric coordinates is performed by the plurality of terminal devices or a server in response to a receipt of image data from the plurality of the terminal devices.

3. The method of claim 1, wherein the construction of the coordinate conversion is performed by the plurality of the terminal devices or the server in response to a receipt of the location-based data from the two sources.

4. The method of claim 3, wherein, in response to the construction of the coordinate conversion by the server, transmitting the constructed coordinate conversion to the at least one terminal device.

5. The method of claim 1, wherein the terminal device specific virtual reality representation is generated by a terminal device by applying a constructed terminal device specific coordinate conversion of another terminal device.

6. The method of claim 5, wherein an application of the constructed coordinate conversion of the other terminal device is performed in a context of image data stored in a memory of the other terminal device.

7. A system for generating virtual reality representation, the system comprising:
a plurality of terminal devices,
a server,
wherein the system is configured to:
generate, for the plurality of terminal devices, location-based data from two sources, a first location-based data representing a terminal device specific local pose coordinates, the first location-based data is obtained from at least one odometric sensor, and a second location-based data representing photogrammetric coordinates, the second location-based data is obtained from an image captured with each terminal device of the plurality of terminal devices and generated at predefined intervals in non-real-time,
construct, for the plurality of terminal devices, a terminal device specific coordinate conversion mechanism between the local pose coordinates and the photogrammetric coordinates, the terminal device specific coordinate conversion mechanism is constructed based on a common photogrammetric coordinate system established based on a common object in images captured with each terminal device,
wherein the plurality of terminal devices are configured to:
receive virtual content in the photogrammetric coordinates based on the location of the terminal device in the photogrammetric coordinates, and
generate terminal device specific virtual reality representation by applying the constructed terminal device specific coordinate conversion to the received virtual content.

8. The system of claim 7, wherein the generation of the second location-based data representing the photogrammetric coordinates is configured to be performed by the plurality of terminal devices or a server in response to a receipt of image data from the plurality of terminal devices.

9. The system of claim 7, wherein the construction of the coordinate conversion is configured to be performed by the plurality of the terminal devices or the server in response to a receipt of the location-based data from the two sources.

10. The system of claim 9, wherein the server is configured to, in response to the construction of the coordinate conversion, transmit the constructed coordinate conversion to the at least one terminal device.

11. The system of claim 7, wherein the terminal device specific virtual reality representation is configured to be generated by a terminal device by applying a constructed terminal device specific coordinate conversion of another terminal device.

12. The system of claim 7, wherein an application of the constructed coordinate conversion of the other terminal device is configured to be performed in a context of image data stored in a memory of the other terminal device.

13. A non-transitory computer-readable medium with a computer program product stored thereon which, when executed by at least one processor, cause a computing device to perform a method comprising:

generating, for a plurality of terminal devices, location-based data from two sources, a first location-based data representing a terminal device specific local pose coordinates, the first location-based data is obtained from at least one odometric sensor, and a second location-based data representing photogrammetric coordinates, the second location-based data is obtained from an image captured with each terminal device of the plurality of terminal devices and generated at predefined intervals in non-real-time, constructing, for the plurality of terminal devices, a terminal device specific coordinate conversion mechanism between the local pose coordinates and the photogrammetric coordinates, the terminal device specific coordinate conversion mechanism is constructed based on a common photogrammetric coordinate system established based on a common object in images captured with each terminal device, receiving virtual content in the photogrammetric coordinates based on the location of the terminal device in the photogrammetric coordinates, and generating terminal device specific virtual reality representation by applying the constructed terminal device specific coordinate conversion to the received virtual content.

\* \* \* \* \*